United States Patent [19]

Holmquist

[11] Patent Number: 4,729,449
[45] Date of Patent: Mar. 8, 1988

[54] AUTOMATICALLY GUIDED VEHICLE HAVING STEERING MECHANISM FOR ENABLING VEHICLE TO FOLLOW GUIDANCE WIRE

[75] Inventor: Fredrik Holmquist, Charlotte, N.C.

[73] Assignee: NDC Technologies, Inc., Charlotte, N.C.

[21] Appl. No.: 805,540

[22] Filed: Dec. 6, 1985

[51] Int. Cl.[4] .............................................. B60T 7/16
[52] U.S. Cl. ..................................... 180/168; 318/16; 342/71; 364/426
[58] Field of Search ................ 180/167, 168; 364/424, 364/426; 318/16, 17; 342/70, 71; 340/52 R; 446/135, 136, 441, 444

[56] References Cited

U.S. PATENT DOCUMENTS 3,912,037 10/1975 Krieg ..................................... 180/168

FOREIGN PATENT DOCUMENTS 72007 4/1985 Japan ..................................... 318/16

Primary Examiner—John J. Love
Assistant Examiner—Eric Culbreth
Attorney, Agent, or Firm—W. Thad Adams, III

[57] ABSTRACT

An automatically guided vehicle (V) having a steering mechanism for enabling the vehicle to follow a guidance wire is disclosed. The vehicle includes a pair of spaced-apart steer drive antennas (S1, S2) and a pair of spaced-apart differential drive antennas (D1, D2). The steer drive antennas and differential drive antennas are in mutual perpendicular relation to each other and are stationarily mounted on the vehicle (V). In a steer drive mode, wheels (12) and (13) are separately controlled by steer drive antennas (S1) and (S2), respectively. The antennas cause the wheels to turn and therefore guides the vehicle (V) so that a wire (W) is followed.

In a differential drive mode, wheels (12) and (13) that are positioned in parallel driving relation to each other and are controlled by antennas (D1, D2) respectively by varying the speed of the wheels (12, 13) to cause the vehicle (V) to follow the wire (W).

7 Claims, 20 Drawing Figures

AUTOMATICALLY GUIDED VEHICLE HAVING STEERING MECHANISM FOR ENABLING VEHICLE TO FOLLOW GUIDANCE WIRE

TECHNICAL BACKGROUND OF THE INVENTION

This invention relates to a vehicle having a steering mechanism for enabling the vehicle to follow a guidance wire, such as a metallic wire or an optical wire, or fiber embedded in or applied to the surface of a vehicle supporting floor. The invention also relates to a method for guiding such a vehicle by means of such a guidance wire.

Automatically guided vehicles are used more and more often in both industrial and commercial operations. Vehicles of the type referred to in this application most commonly follow a wire embedded in or applied to the surface on which the vehicle moves. Guidance is by means of sensing devices that are typically placed on the undercarriage of the vehicle which sense the presence of the guidance wire and control the movement of the vehicle relative to the wire in response to programmed instructions. Such vehicles are used in warehousing operations to "pick" and deliver stock or inventory. Such vehicles also have application in assembly plants where items in the process of manufacture are delivered to successive stations by the vehicles.

A continuing problem in the development and use of automatically guided vehicles is the relative inability of such vehicles to maneuver accurately in tight spaces—particularly close right angle turns and the like. Recent developments include the device shown in the Krieg Patent, U.S. Pat. No. 3,912,037. This patent discloses an automobile assembly vehicle transport. The transport is controlled by antennas connected to and pivotally movable with driving wheels, one of which is a master and one of which is a slave. In one configuration, the wheels of the vehicles are substantially parallel to the longitudinal extent of the vehicle. However, when desired, the wheels can be turned perpendicular to the longitudinal width of the vehicle with the speed of at least one of the wheels being varied relative to the other wheel to permit movement of the vehicle by differential drive. Such a configuration presents a number of drawbacks. First, calibration of the movable antennas is critical. Secondly, the necessity for the antennas to be movable with the wheels limits substantially the variety of configurations which vehicles using this type of drive means can assume.

SUMMARY OF THE INVENTION

Therefore, it is an object of the invention to provide a steering mechanism for enabling a vehicle to follow a guidance wire.

It is another object of the invention to provide a steering mechanism for enabling a vehicle to follow a guidance wire, wherein the direction of the vehicle is controllable both by steering the wheels and by differential drive of the wheels.

It is yet another object of the invention to provide a steering mechanism for enabling a vehicle to follow a guidance wire, wherein the antennas which sense the presence of the wire are stationarily mounted on the underside of the vehicle and do not mechanically cooperate with the vehicle's wheels.

It is another object of the present invention to provide a steering mechanism for enabling a vehicle to receive commands from the guidance wire.

It is still another object of the present invention to provide a steering mechanism for enabling a vehicle to follow a guidance wire, wherein a plurality of wires are provided at designated places for being sensed by the vehicle antennas and used to control the speed and/or direction of the vehicle.

These and other objects of the present invention are achieved in the preferred embodiments disclosed below by providing a steering mechanism for enabling a vehicle to follow a guidance wire, wherein the steering mechanism comprises first and second cooperating steer drive antennas stationarily affixed in spaced-apart relation on the vehicle in such position as to sense the position of the guidance wire. First and second cooperating differential drive antennas are also stationarily affixed in a spaced-apart relation on the vehicle in wire sensing relation and have an axis of alignment perpendicular to the first and second steer drive antennas.

First drive wheel means are provided and include a first drive wheel having steering and driving means mounted on the vehicle for propelling and steering the vehicle along a surface. A second drive wheel means is also provided and includes a second drive wheel mounted on the vehicle in spaced-apart relation to the first drive wheel and having steering and driving means for propelling and steering the vehicle along a surface. Control means operatively connect the steering means of the first drive wheel to the first steer drive antenna and to the first differential drive antenna. The control means also operatively connect the steering means of the second drive wheel to the second steer drive antenna and the second differential drive antenna.

Therefore, the steering mechanism operates in two modes. In the steer drive mode, the control means positions the first and second drive wheels in front-to-back driving and steering relation for steering movement of the first drive wheel in response to lateral relative movement between the guidance wire and the first steer drive antenna, and independent steering movement of the second drive wheel in response to lateral relative movement between the guidance wire and the second steer drive antenna.

In the differential drive mode, the control means rotates the first and second drive wheels into a position substantially perpendicular from the steer drive position and into mutual coaxial relation. Accordingly, the vehicle may be moved in a direction substantially perpendicular to the direction of movement in the steer drive mode by differential speed control of the first and second drive wheels in response to lateral relative movement between the guidance wire and the first and second differential drive antennas. In this manner, he vehicle can be guided along a straight or senuous path by the first and second drive wheels in steer drive relation and then moved perpendicularly into and out of restricted-size areas along a straight or sinuous path by the drive wheels in their differential drive position.

The control means includes a computer for receiving and processing first and second steer drive antenna input signals and outputting a drive signal and a steer signal.

The first and second drive wheel means includes respective first and second drive wheel motors for receiving drive signals and rotating the drive wheels in response to the drive signals. First and second steer motors are provided for receiving the steer signal and for steering the drive wheels for the steer drive mode in the direction indicated by the steer signal.

Preferably, the first drive wheel means includes a master servo drive cooperating with the first drive motor and the second drive wheel means includes a slave servo drive cooperating with the second drive motor. The slave servo drive includes master drive motor referencing means whereby the second drive wheel is controlled by and drives with the same force as the first drive wheel.

In accordance with one embodiment of the invention, mechanical motion transfer means operatively interconnect the first and second steer wheels for transmitting steering movement of the leading drive wheel to the following drive wheel in an opposite direction whereby when the leading wheel turns in a direction, the following drive turns in the opposite direction to the corresponding degree. Preferably, the mechanical motion transfer means comprises a gear.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENT

Figure 1:
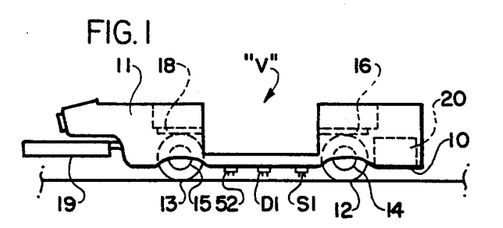
FIG. 1 is a side elevational view of a hypothetical vehicle with a steering mechanism according to the present invention.
Figure 2:
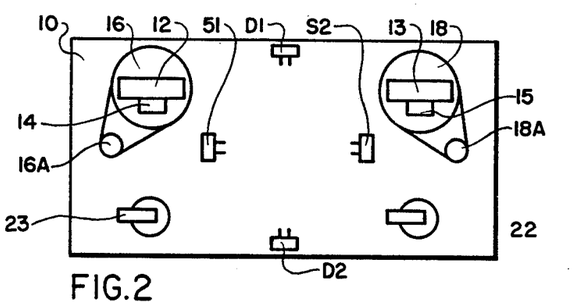
FIG. 2 is a plan view of the underside of a vehicle according to one embodiment of the present invention.
Figure 3:
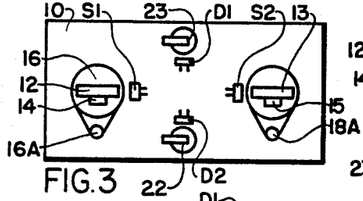
FIG. 3 is a plan view of the underside of a vehicle according to another embodiment of the present invention.
Figure 4:
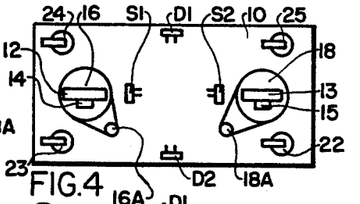
FIG. 4 is a plan view of the underside of a vehicle according to another embodiment of the present invention.
Figure 5:
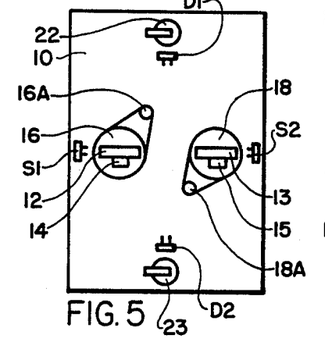
FIG. 5 is a plan view of the underside of a vehicle according to another embodiment of the present invention.
Figure 6:
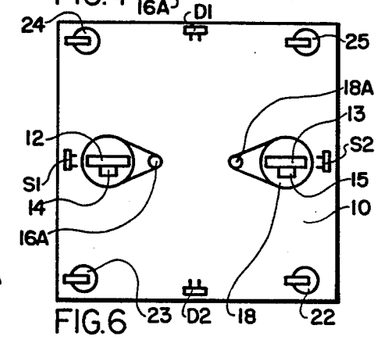
FIG. 6 is a plan view of the underside of a vehicle according to another embodiment of the present invention.

Referring now specifically to the drawings, a hypothetical vehicle "V" having a steering mechanism according to the present invention is shown. Generally, the vehicle comprises a frame 10 on which is mounted a chassis 11. Frame 10 carries a pair of drive wheels 12 and 13 each having its own drive motor 14 and 15, respectively. Each wheel 12 and 13 is also mounted for independent steering on a turnable steering platform 16 and 18, respectively.

Vehicle "V" also includes a bumper 19 which is operatively connected to the drive motors 14 and 15 to stop the vehicle in the case of an obstruction. Vehicle "V" also includes an onboard controller 20, which is further described below.

For a more specific description of the steering mechanism portion of the vehicle, reference is now made to FIGS. 2-6. As is shown in FIGS. 2-6, the configuration of the steering mechanism of the vehicle can take a number of different configurations. In the embodiments disclosed in this application, driving and steering is performed by the two wheels 12 and 13. Stability of the vehicle is maintained by the provision of separate castor wheels 22 and 23 which are so positioned as to provide the vehicle a solid base. Note that in FIGS. 4 and 6 additional castor wheels 24 and 25 are provided. Each of the embodiments shown in FIGS. 2-6 also includes a pair of spaced-apart steer drive antennas S1 and S2, and a pair of spaced-apart differential drive antennas D1 and D2. Note that steer drive antennas S1-S2 and differential drive antennas D1-D2 are in mutual perpendicular relation to each other.

In all of the examples described below, the vehicle follows a path along the surface on which the vehicle is supported. In the embodiment illustrated in this application, guidance is by means of a wire "W" embedded in or applied to the surface. A current is passed through the wire which propagates an electromagnetic field. The presence of the field is induced by the antennas S1-S2 and D1-D2 in the manner described below. When the antennas are directly over the wire, a net 0 voltage is induced. As the antenna moves to the left or the right of the wire, a voltage is induced which is used to alter the direction of the vehicle so that the antenna is returned to its position directly over the wire.

In one of the embodiments, only a single wire is used. Various commands are delivered to the vehicle through the wire by means of discrete frequencies which can be received and discriminated by the controller 20 on board the vehicle.

In another embodiment, each wire carries a separate frequency, and branch loops of the wire carrying distinct frequencies are used to command the vehicle to decelerate, accelerate, start or stop.

There are two basic modes by which steering may take place. One mode is by turning the wheels so that the vehicle follows the wire "W". This is referred to as the "steer drive mode."

Figure 7:
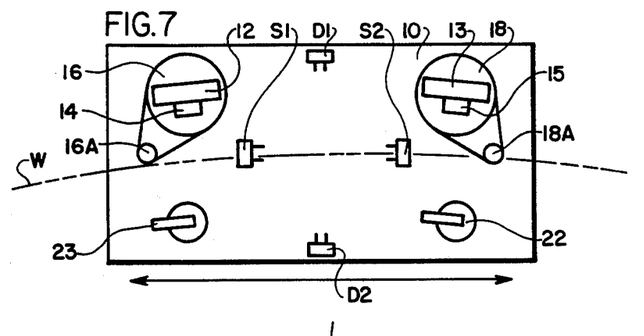
FIG. 7 is a plan view of the underside of the vehicle shown in FIG. 2 in its steer drive mode.
Figure 15:
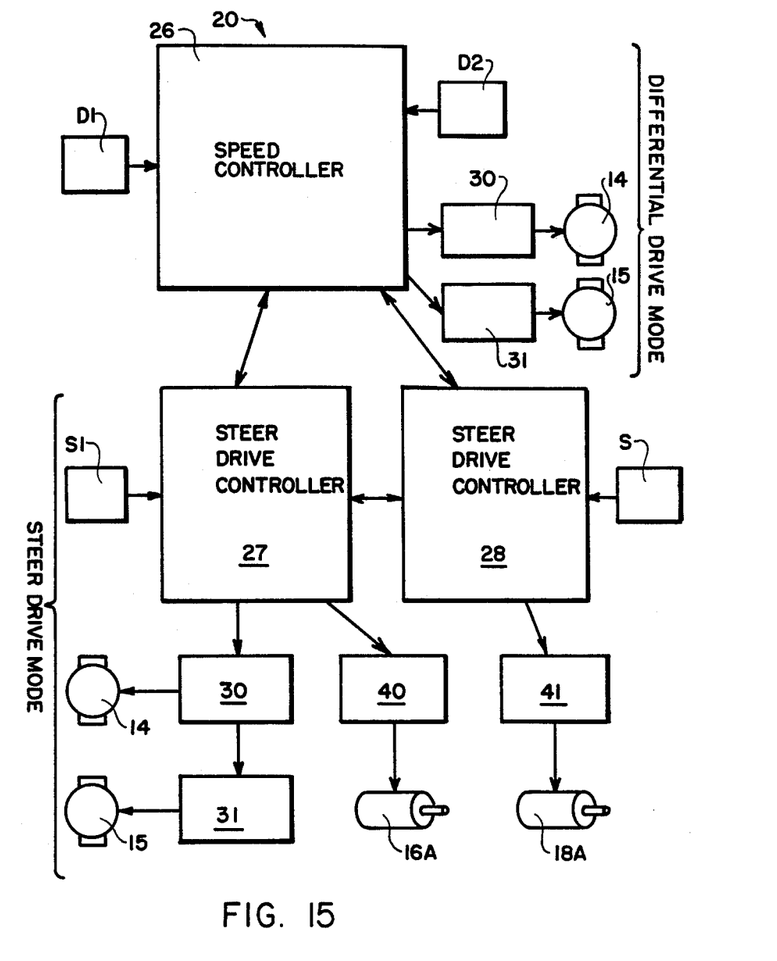
FIG. 15 is a block diagram of an embodiment of the invention using multiple controllers.

Referring now to FIG. 7, one way of controlling the vehicle in the steer drive mode is shown. As noted above, each wheel 12 and 13 has its own steering platform 16 and 18, which is turned by a steer drive motor 16A and 18A, respectively. Steer drive antenna S1 controls wheel 12 and steer drive antenna S2 independently controls wheel 13. As the vehicle approaches a curve in wire "W", the front wheel 13 begins turning first and then the rear wheel 12. Both antennas S1 and S2 are always following the loop. Therefore, there are two points on the vehicle that always follow wire "W." This means that the separate steer drives perform different tasks. Of course, since the wheels are following the loop at different points, the speed will likewise vary, but only slightly. This function is illustrated in FIG. 15. The controller 20 according to this embodiment includes a speed controller 26 which is operatively connected to the differential drive antennas D1 and D2 which control drive motors 14 and 15 through a master servo amplifier 30 and a slave servo amplifier 31.

As noted above, antennas S1 and S2 separately steer their respective wheels 12 and 13. Still assuming that wheel 13 is in the direction of movement of the vehicle, speed control is maintained by causing slave servo amplifier 31 to reference master servo amplifier 30 so that the respective drive motors 14 and 15 maintain approximately the same speed. At the same time, a steer drive controller 27 is sensing the presence of wire "W" through antenna S1 and directing a steering output signal to steer motor 16A which controls steering platform 16. Steer drive controller 28 independently senses the position of wire "W" from steer drive antenna S2 and outputs an appropriate steering signal to steering motor 18A.

Figure 9:
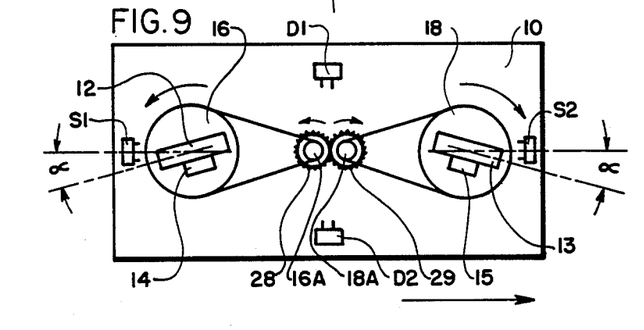
FIG. 9 is a plan view of a vehicle according to another embodiment of the invention in the steer drive mode wherein the steering is mechanically controlled.
Figure 13:
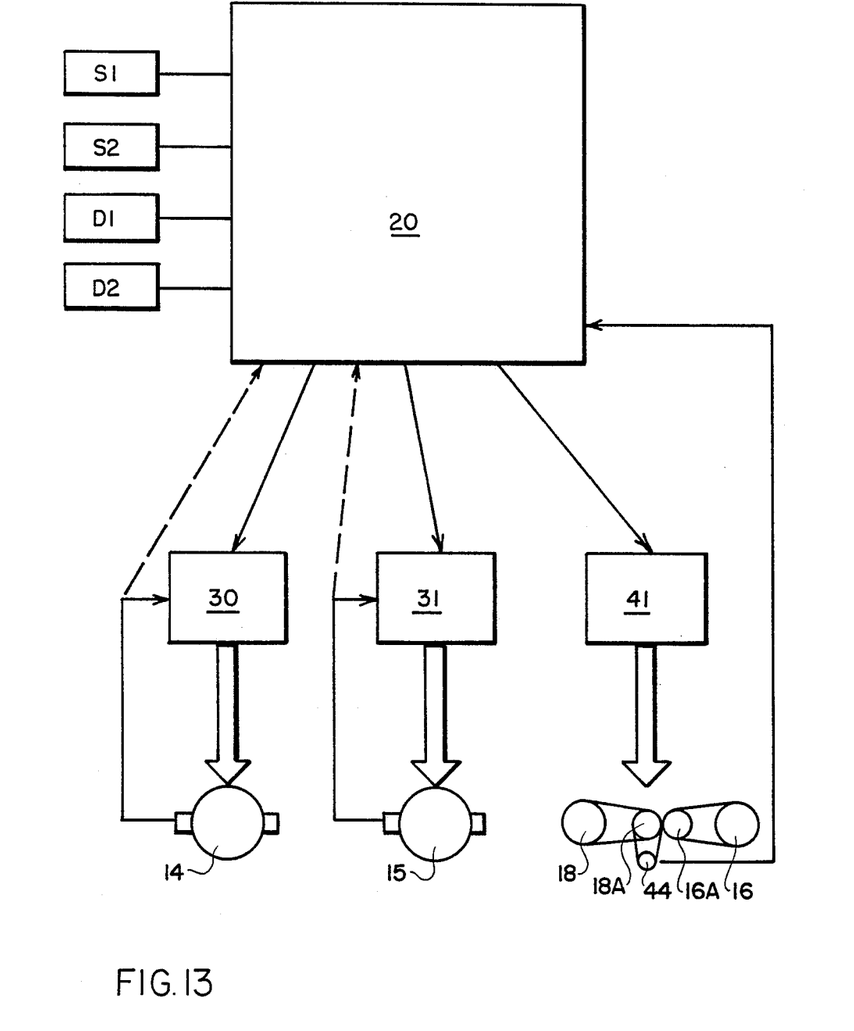
FIG. 13 is a block diagram of the operation of a vehicle according to the present invention with a single controller in the steer drive mode.

Another means of controlling the vehicle in the steer drive mode is shown in FIGS. 9 and 13. The steer drive mode shown is by means of a mechanical, single antenna guidance, also referred to as mechanical antiparallel guidance. In this configuration, only a single antenna, the leading antenna—is used. In the example shown in FIG. 9, steer drive antenna S2 in the leading direction of the vehicle is used to sense the presence of wire "W." Drive motors 14 and 15 are controlled through a single controller 20 by master drive servo and slave drive servo 30 and 31, respectively, at the same speed. Steering servo 41 is controlled by antenna S1. When wire "W" begins to move to one side or the other relative to antenna S1, the antenna picks up a differential voltage which causes steer motor 18A to turn. As steer motor 18A turns, a potentiometer 44 sends an output signal to the vehicle controller which corresponds to the degree of movement of steer motor 18A. When steer motor 18A has turned to the degree necessary to maintain proper steering, the potentiometer is sending a signal to controller which matches the signal received by antenna S1, effectively neutralizing each other and causing steering motor 18A to stop turning. Still referring to FIG. 9, a mechanical linkage of wheels 12 and 13, such as by gears 28 and 29 (see FIG. 9), causes wheel 12 to move to the same degree in the opposite direction as wheel 13. Since the angle is always the same, the two drives are always going at the same speed. Therefore, the speed can be controlled by the same reference value as described above. Therefore, in this configuration there is a single drive signal through servos 30 and 31, and a single steering signal through steering servo 41.

Figure 10:
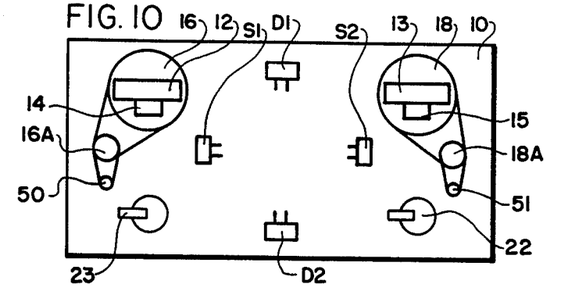
FIG. 10 is a plan view of a vehicle in the steer drive mode wherein steering is achieved by feedback potentiometers.
Figure 12:
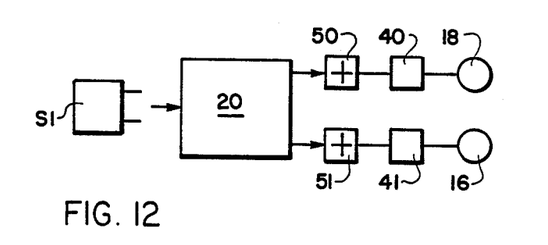
FIG. 12 is a block diagram of the manner in which the electrical steer drive steering signal is generated using a single antenna.
Figure 14:
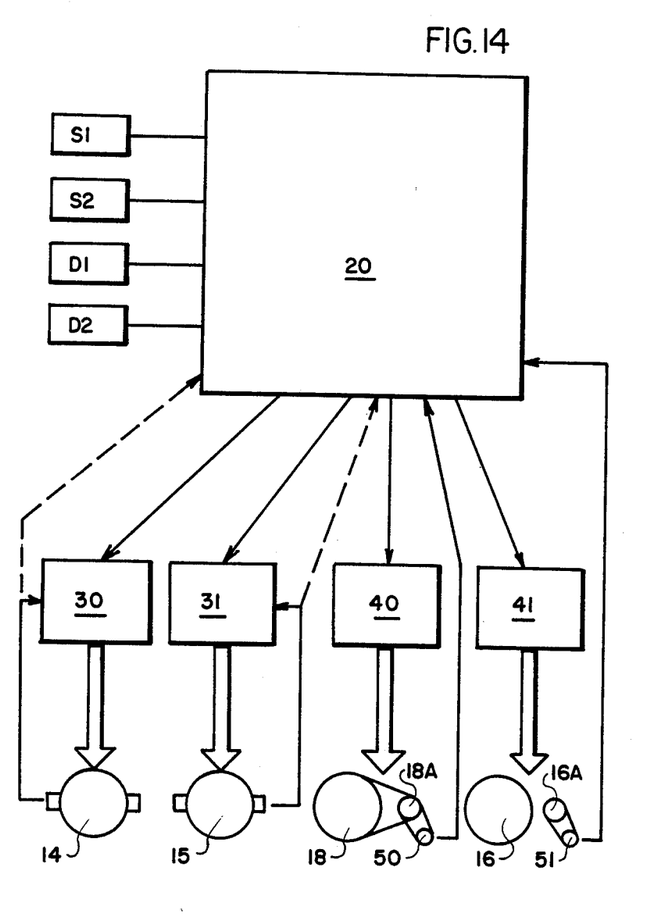
FIG. 14 is a block diagram of operation of the vehicle in accordance with the present invention with a single controller in the electrical steer drive mode.

Another alternative in the steer drive mode is electrical single antenna guidance or, electrical antiparallel guidance. This method of steering is shown in FIGS. 14 and 10. In FIG. 10, it can be seen that both wheels 12 and 13 are provided with their own feedback potentiometers 50 and 51. Steering still occurs by antenna S1 sensing the presence of wire "W." The signal from antenna S1 is individually summed with the two feedback potentiometers 50 and 51 to give a reference value to the two steer servos 40 and 41. This process is schematically illustrated in FIG. 12. This results in antiparallel steering which, because of the exactly antiparallel position of wheels 12 and 13 at all times, provides essentially equal speed of the two drive motors 14 and 15. Therefore, the drive motors 14 and 15 can be run separately with the same reference signal.

DIFFERENTIAL DRIVE MODE

Figure 8:
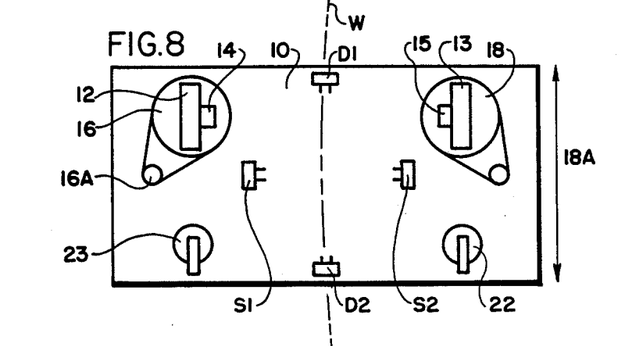
FIG. 8 is a plan view of the vehicle shown in FIG. 2 in its differential mode.
Figure 11:
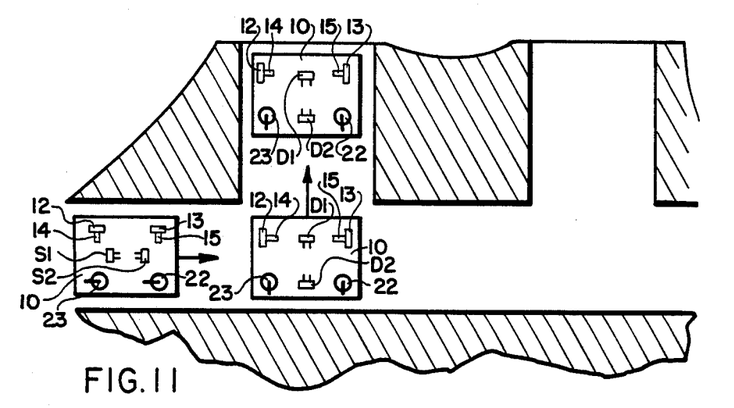
FIG. 11 is a plan view of a hypothetical vehicle pathway, showing movement of the vehicle at right angles by changing from the steer drive mode to the differential drive mode.

The other basic mode of driving the vehicle is in a differential drive mode. This configuration is shown in FIGS. 8, 11 and 15. Referring to FIG. 8, it can be seen that in the differential drive mode, the two wheels 12 and 13 are turned 90 degrees and are in a mutually parallel configuration. Wheels 12 and 13 remain in this relative position and, in fact, the position of wheels 12 and 13 can be fixed by mechanical means or can be maintained stationary by an electrical signal. When in the differential drive mode, only one antenna at any given time is being used for guidance purposes. For exammple, in FIG. 8, the vehicle is moving in the direction of differential drive antenna D1. If the wheels 12 and 13 are controlled electrically, the two steer motors 16A and 18A both have a 90 degree reference value relative to the longitudinal axis of vehicle V which, in accordance with the schematic shown in FIG. 15 will maintain wheels 12 and 13 in the same position. Then, the direction of the vehicle is controlled only by controlling the relative speed of drive motors 14 and 15. This occurs by sensing the offset between antenna D1 and the wire. This offset is sensed by the speed controller 26 and a correction signal is transmitted to speed servos 30 and 31.

The ability to switch between the steer drive mode and the differential drive mode is particularly useful in the situation shown in FIG. 11. By turning the wheels 12 and 13 90 degrees, the vehicle can be stopped in front of a loading bay and then moved perpendicularly into the bay without the necessity of the vehicle negotiating a curve.

In addition to control of vehicle direction, there must be means to start, speed up, slow down and stop the vehicle. In the preferred embodiment according to this invention, all such commands are delivered through the single wire "W" referred to above. This is accomplished by means of a remote vehicle controller (not shown) which communicates with the vehicle by the wire. According to the preferred embodiment, the wire is constructed to carry a 400 milliamp current. The direction guidance current preferably has a frequency of between 1650 hertz and 4000 hertz. Within this range, four discrete frequencies are established and are sensed and discriminated by the antennas by means of appropriate filters. In addition, vehicle position can be communicated through the same wire by means of a transmitter on the vehicle which transmits position data to the remote vehicle controller. Digital communication is achieved through frequency shift modulation through a frequency modulated transmitter. This is accomplished by defining a given frequency as being equal to 0 and another discrete frequency as being equal to 1. Then, the transmitter modulates between these two frequencies thereby generating a bit stream in binary code which can be received and interpreted through the wire by the remote vehicle controller.

Figure 16:
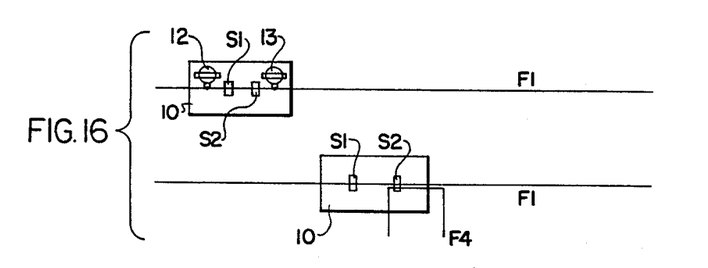
FIG. 16 is a schematic illustrating the use of a branch loop to stop the vehicle while proceeding in the forward direction in the steer drive mode.

Another way of controlling the vehicle is illustrated in FIGS. 16–21. In this configuration, branch loops carrying different frequencies F2, F3 and F4 are positioned adjacent the primary guidance wire carrying frequency F1. In FIG. 16 steering is accomplished with frequency F1. When antenna S2 senses a branch loop carrying frequency F4, it is commanded to stop.

Figure 17:
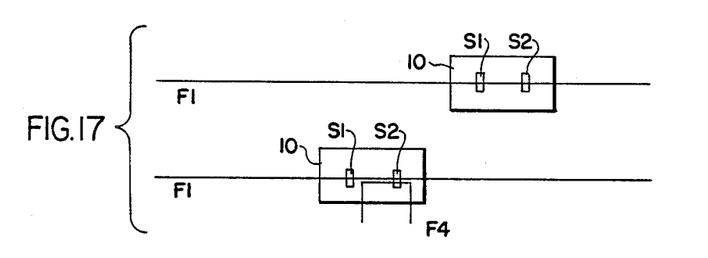
FIG. 17 is a schematic showing the use of a branch loop to stop the vehicle while proceeding rearwardly in the steer drive mode.

With vehicle moving in the opposite direction, as is shown in FIG. 17, detection of branch loop carrying frequency F4 by antenna S2 will also bring the vehicle to a stop.

Figure 18:
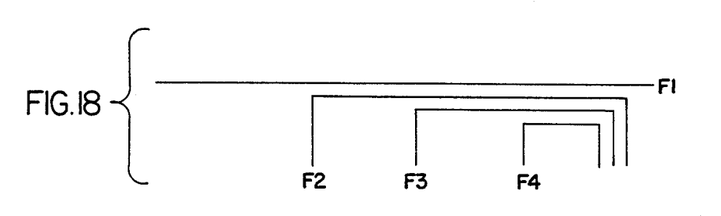
FIG. 18 is a schematic view showing the use of multiple branch loops to successively reduce the speed of and then stop the vehicle.

FIG. 18 illustrates that the branch loops can be nested, each carrying a different frequency to cause the vehicle to slow down from a high speed to a mid-range speed (F2) to a low-speed (F3) and finally stop (F4).

Figure 19:
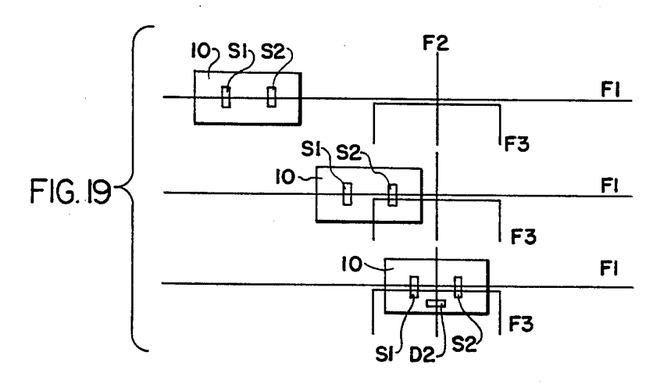
FIG. 19 is a schematic view showing the manner in which the vehicle is stopped and changed from its steer drive to its differential drive mode by using branch loops.

Switching between the steer drive mode and differential drive mode can also be accomplished by means of branch loops. As is shown in FIG. 19, the main wire on which the vehicle is traveling carries frequency F1. A cross wire carrying frequency F2 intersects wire carrying frequency F1. A branch loop carrying a third frequency F3 intersects the F2 wire and travels parallel to the F1 wire. The vehicle traveling in the steer drive mode approaches the branch loop carrying frequency F3. Detection of the branch loop by antenna S2 reduces the vehicle speed. When both antennas S2 and S1 have sensed the branch loop and antenna D2 has sensed the cross wire carrying frequency F2, then, an internal command is given from the vehicle controller 20 for wheels 12 and 13 to rotate 90 degrees into their differential drive mode (see FIG. 8).

Figure 20:
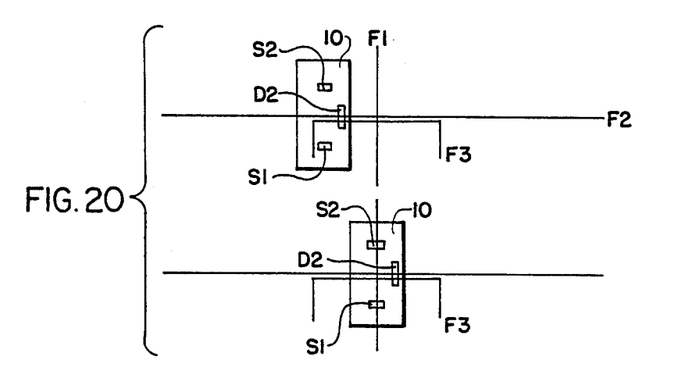
FIG. 20 is a schematic showing the use of a branch loop to change the vehicle from the differential drive mode to the steer drive mode.

Finally, vehicle can be switched from the differential drive mode back to the steer drive mode as is shown in FIG. 20. Upon differential drive antenna D2 sensing branch loop carrying frequency F3, it shifts to low speed. When steer drive antennas S1 and S2 have both sensed wire carrying frequency F1, the vehicle is commanded to stop and then the wheels are turned again into their steer drive position, as is shown in FIG. 10.

It will be apparent that numerous vehicle commands can be achieved in this manner. The above examples are merely illustrative.

A steering mechanism is described above. Various details of the invention may be changed without departing from its scope. Furthermore, the foregoing description of the preferred embodiment of a steering mechanism according to the present invention is provided for the purposes of illustration only and not for the purpose of limitation—the invention being defined by the claims.

I claim:

1. A steering mechanism for enabling a vehicle to follow a guidance wire, said steering mechanism comprising:

(a) first and second cooperating steer drive antennas stationarily affixed in spaced-apart relation on said vehicle in wire sensing relation thereto;
(b) a differential drive antenna stationarily affixed on said vehicle in wire sensing relation thereto and oriented perpendicular to said first and second steer drive antennas;
(c) first drive wheel means including a first drive wheel mounted on said vehicle and having steering and driving means for propelling and steering said vehicle along a surface;
(d) second drive wheel means including a second drive wheel mounted on said vehicle in spaced-apart relation to said first drive wheel and having steering and driving means for propelling and steering said vehicle along a surface;
(e) control means operatively connecting the steering means of said first drive wheel to said first steer drive antenna and to said differential drive antenna, and, the steering means of said second drive wheel to said second steer drive antenna and said differential drive antenna; said control means further including means for;
(f) in a steer drive mode, positioning said first and second drive wheels in front-to-back, driving and steering relation for steering movement of said first drive wheel in response to lateral relative movement between said guidance wire and said first steer drive antenna and steering movement of said second drive wheel in response to lateral relative movement between said guidance wire and said second steer drive antenna; the steering movement of said first drive wheel being independent of the steering movement of the second drive wheel; and
(g) in a differential drive mode, rotating said first and second drive wheels into a position substantially perpendicular from the steer drive position and into mutual parallel relation whereby said vehicle may be moved in a direction substantially perpendicular to the direction of movement in the steer drive mode in a straight-line or sinuous path by differential speed control of said first and second drive wheels in response to lateral relative movement between said guidance wire and said second differential drive antenna;

whereby said vehicle can be guided along a straight or sinuous path by said first and second drive wheels in steer drive relation and then moved perpendicularly along a straight or sinuous path by said drive wheels in differential drive position.

2. A steering mechanism according to claim 1, wherein said control means includes a computer for receiving and processing first and second steer drive antenna input signals and outputting drive signals and steer signals.

3. A steering mechanism according to claim 2, wherein said steer signals comprise separate first and second steer signals for said first and second drive wheels, respectively.

4. A steering mechanism for enabling a vehicle to follow a guidance wire, said steering mechanism comprising:

(a) a steer drive antenna stationarily affixed on said vehicle in wire sensing relation thereto;
(b) a differential drive antenna stationarily affixed on said vehicle in wire sensing relation thereto and oriented perpendicular to said steer drive antenna;

(c) first drive wheel means including a first drive wheel mounted on said vehicle and having steering and driving means for propelling and steering said vehicle along a surface;

(d) second drive wheel means including a second drive wheel mounted on said vehicle in spaced-apart relation to said first drive wheel and having steering and driving means for propelling and steering said vehicle along a surface;

(e) control means operatively connecting the steering means of said first drive wheel to said steer drive antenna and to said differential drive antenna, and the steering means of said second drive wheel to said differential drive antenna; said control means further including;

(f) in a steer drive mode, means for steering the first drive wheel in response to lateral relative movement between said guidance wire and said steer drive antenna;

(g) electrical motion transmitting means operatively-connected to said first and second steer wheels for transmitting steering movement information from the leading drive wheel to the following drive wheel whereby when said leading wheel turns in a direction, the following drive wheel turns in the opposite direction to the corresponding degree; and (h) in a differential drive mode, said control means including means to rotate said first and second drive wheels into a position substantially perpendicular from the position of the wheels in the steer drive mode and into mutually parallel relation whereby said vehicle may be moved in a direction substantially perpendicular to the direction of movement in the steer drive mode by differential speed control of said first and second drive wheels in response to lateral relative movement between said guidance wire and said differential drive antenna;

whereby said vehicle can be guided along a straight or sinuous path by said first and second drive wheels in steer drive relation and then moved perpendicularly along a straight or sinuous path by said drive wheels in differential drive position.

5. A steering mechanism according to claim 4, wherein said electrical motion transmitting means comprise first and second feedback potentiometers cooperating with said first and second drive wheels, respectively, wherein said first and second feedback potentiometers send a signal from the respective drive wheels to said controller representing the angular position of the respective wheels for addition to the antenna signal to control steering movement.

6. A steering mechanism for enabling a vehicle to follow a guidance wire, said steering mechanism comprising:

(a) first and second cooperating steer drive antennas stationarily affixed in spaced-apart relation on said vehicle in wire sensing relation thereto;

(b) first and second cooperating differential drive antennas stationarily affixed in spaced-apart relation on said vehicle in wire sensing relation thereto and oriented perpendicular to said first and second steer drive antennas;

(c) first drive wheel means including a first drive wheel mounted on said vehicle and having steering and driving means for propelling and steering said vehicle along a surface;

(d) second drive wheel means including a second drive wheel mounted on said vehicle in spaced-apart relation to said first drive wheel and having steering and driving means for propelling and steering said vehicle along a surface;

(e) control means operatively connecting said first drive wheel to said first steer drive antenna and to said first differential drive antenna, and said second drive wheel to said second steer drive antenna, and said second differential drive antenna; said control means further including means for;

(f) in a steer drive mode, designating as a leading steer drive antenna that steer drive antenna on an end of the vehicle forward in the direction of movement on said vehicle, for steering movement of the corresponding drive wheel in response to said lateral relative movement between said guidance wire and said leading drive antenna;

(g) electrical motion transmitting means operatively connected to said first and second steer wheels for transmitting steering movement information from the leading drive wheel to the following drive wheel whereby when said leading wheel turns in a direction, the following drive wheel turns in the opposite direction to the corresponding degree; and (h) wherein in the differential drive mode, said control means rotate said first and second drive wheels into a position substantially perpendicular from the steer drive position and into mutually parallel relation whereby said vehicle may be moved in a direction substantially perpendicular to the direction of movement in the steer drive mode by differential speed control of said first and second drive wheels in response to lateral relative movement between said guidance wire and said first differential drive antenna if the vehicle is moving in one direction and the second differential drive antenna if the vehicle is moving in the opposite direction;

whereby said vehicle can be guided along a straight or sinuous path by said first and second drive wheels in steer drive relation and then along a straight or sinuous path by said drive wheels in differential drive position.

7. A steering mechanism according to claim 6, wherein said electrical control means comprises first and second feedback potentiometers cooperating with said first and second drive wheels, respectively, wherein said first and second feedback potentiometers send a signal from the respective drive wheels to said controller representing the angular position of the respective wheels for addition to the antenna signal to control steering movement.

* * * * *